US011523293B1

(12) United States Patent
Gundert (10) Patent No.: US 11,523,293 B1
(45) Date of Patent: Dec. 6, 2022

(54) WIRELESS NETWORK MONITORING SYSTEM

(71) Applicant: Levi Gundert, El Cajon, CA (US)

(72) Inventor: Levi Gundert, El Cajon, CA (US)

( * ) Notice: Subject to any disclaimer, the term of this patent is extended or adjusted under 35 U.S.C. 154(b) by 0 days.

(21) Appl. No.: 17/499,395

(22) Filed: Oct. 12, 2021

(51) Int. Cl.
*H04W 24/08* (2009.01)
*H04L 43/0817* (2022.01)
*H04L 43/0876* (2022.01)
*H04W 24/02* (2009.01)

(52) U.S. Cl.
CPC ......... *H04W 24/08* (2013.01); *H04L 43/0817* (2013.01); *H04L 43/0876* (2013.01); *H04W 24/02* (2013.01)

(58) Field of Classification Search
None
See application file for complete search history.

(56) References Cited

U.S. PATENT DOCUMENTS

| | | | | |
|---|---|---|---|---|
| 2006/0150250 A1* | 7/2006 | Lee | ..................... | H04W 12/122 726/23 |
| 2007/0280222 A1* | 12/2007 | Smith | ................. | H04L 12/5692 370/360 |
| 2010/0125900 A1* | 5/2010 | Dennerline | ......... | H04L 63/1416 726/13 |
| 2010/0272049 A1* | 10/2010 | Tung | ..................... | H04W 88/06 370/329 |
| 2011/0243021 A1* | 10/2011 | Ponnuswamy | ......... | H04L 43/08 370/252 |
| 2014/0181972 A1* | 6/2014 | Karta | .................. | H04L 63/1416 726/23 |
| 2016/0301707 A1* | 10/2016 | Cheng | ..................... | H04L 67/12 |
| 2016/0308898 A1* | 10/2016 | Teeple | ............... | H04L 63/1441 |
| 2016/0323299 A1* | 11/2016 | Huston, III | ............. | H04L 67/42 |
| 2016/0366250 A1* | 12/2016 | Lee | ..................... | H04L 43/0876 |
| 2018/0324200 A1* | 11/2018 | Choi | ................... | H04W 12/088 |
| 2019/0104108 A1* | 4/2019 | Rhee | ................... | H04L 63/0209 |
| 2019/0349334 A1* | 11/2019 | Touboul | ............. | H04W 12/122 |
| 2020/0154294 A1* | 5/2020 | Dhanuka | ........... | H04M 1/72412 |

(Continued)

OTHER PUBLICATIONS

Schultz et al., "A passive network appliance for real-time network monitoring", 2011 Seventh ACM/IEEE Symposium on Architectures for Networking and Communications Systems. (Year: 2011).*

(Continued)

*Primary Examiner* — Faruk Hamza
*Assistant Examiner* — Cassandra L Decker
(74) *Attorney, Agent, or Firm* — Kristofer E. Elbing (57) ABSTRACT

A wireless network monitoring system is disclosed. In one general aspect, it includes a wireless network interface operative to access traffic on a wireless network that is connected to other devices and to a WAN access point, and capture logic responsive to the wireless network interface and operative to capture datagrams communicated between one or more of the other devices on the wireless network and the WAN access point. Inspection logic is responsive to the capture logic and operative to inspect the captured datagrams to detect conditions of concern related to the other devices on the wireless network, and conditional response logic is responsive to the inspection logic and operative to initiate actions in response to the detection of conditions of concern by the inspection logic.

19 Claims, 4 Drawing Sheets

(56) References Cited

U.S. PATENT DOCUMENTS

| | | | |
|---|---|---|---|
| 2021/0152595 A1* | 5/2021 | Hansen | H04L 9/0894 |
| 2021/0400071 A1* | 12/2021 | Ray | G06F 16/24568 |
| 2022/0086645 A1* | 3/2022 | Kaushik | H04W 12/122 |

OTHER PUBLICATIONS

Wurm, Christoph, "Analyzing network packets with Wireshark, Elasticsearch, and Kibana", https://www.elastic.co/blog/analyzing-network-packets-with-wireshark-elasticsearch-and-kibana (Year: 2019).*

* cited by examiner

WIRELESS NETWORK MONITORING SYSTEM

FIELD OF THE INVENTION

This invention relates to methods and apparatus for evaluating security and/or protecting systems on wireless computer networks, such as residential or small office Wi-Fi networks.

BACKGROUND OF THE INVENTION

Figure 1:
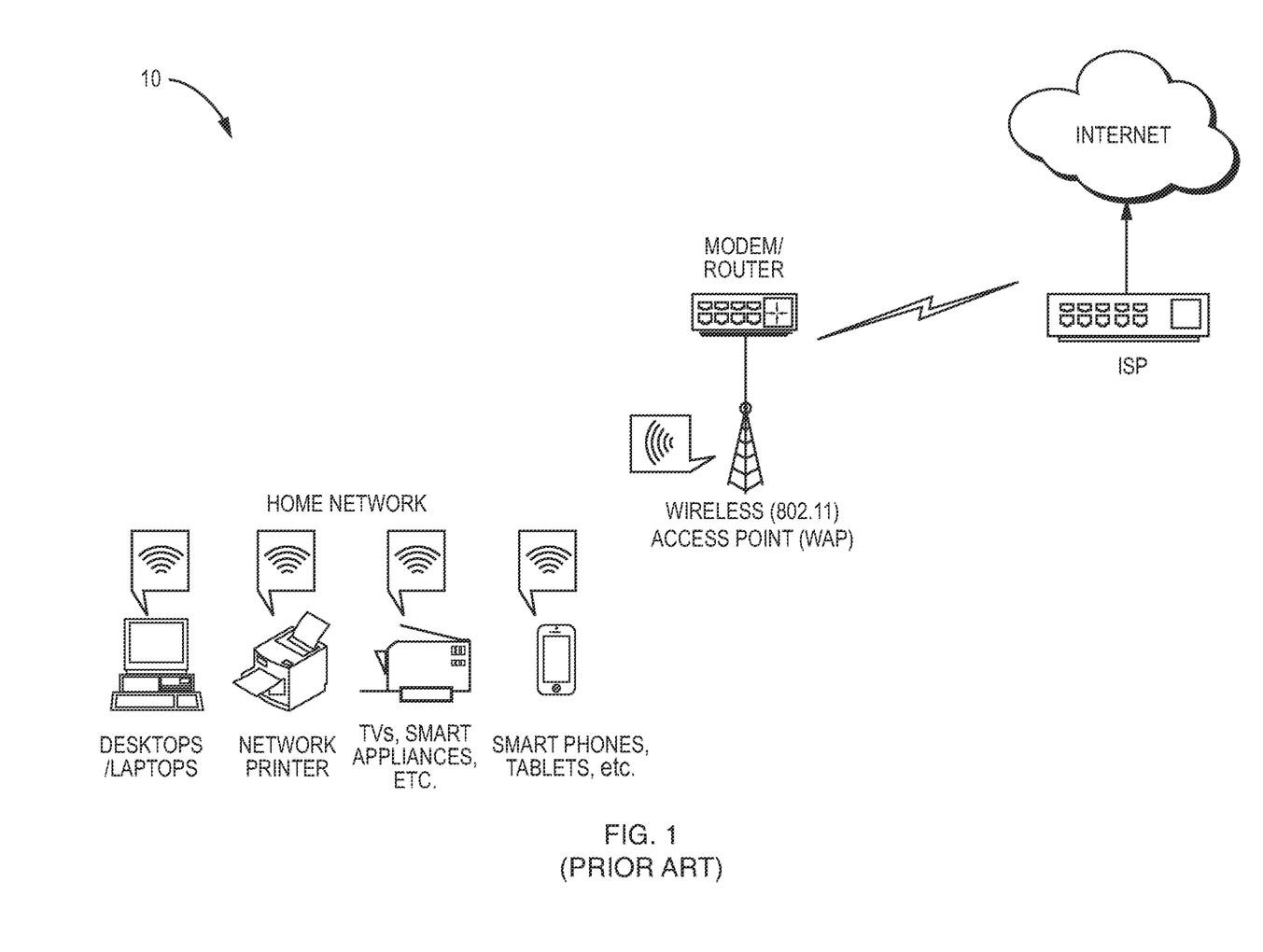
FIG. 1 is a block diagram of a prior art wireless home network in which traffic monitoring takes place in a modem/router.

Security breaches of computer networks are all too common. Large organizations typically employ a team of security professionals who use an array of specialized tools to protect their networks against intrusion, data breaches, insider threats, and other types of attacks in an evolving threat landscape. Home and small-office Wi-Fi networks, on the other hand, are often served by a relatively simple off-the-shelf firewall that may be part of a router or modem (see FIG. 1). Securing these smaller networks has become more important as people increasingly work from home.

SUMMARY OF THE INVENTION

In one general aspect, the invention features a wireless network monitoring system that includes a wireless network interface operative to access traffic on a wireless network that is connected to other devices and to a WAN access point, and capture logic responsive to the wireless network interface and operative to capture datagrams communicated between one or more of the other devices on the wireless network and the WAN access point. Inspection logic is responsive to the capture logic and operative to inspect the captured datagrams to detect conditions of concern related to the other devices on the wireless network, and conditional response logic is responsive to the inspection logic and operative to initiate actions in response to the detection of conditions of concern by the inspection logic.

In preferred embodiments, the wireless network interface and the capture logic can be part of a sensor that is located within a wireless communication range of the wireless network, with at least some of the inspection logic and the conditional response logic being part of a remote data repository system connected to the WAN on an opposite side of the WAN access point from the sensor. The sensor can include a second network interface operative to communicate with the remote data repository system via the WAN access point. The wireless network interface can be a dual-mode interface that can also be configured for connection between the other devices and the WAN access point using unshielded twisted pair cable. The system can further include one or more additional wireless network interfaces operative to access traffic on the wireless network and additional corresponding capture logic to perform distributed monitoring of the wireless network. The system can further include load-balancing logic operative to balance the distribution of monitoring tasks. The system can further include opportunistic communication logic operative to delay or skip operations based on traffic conditions on the wireless network. The system can further include remote communication reset logic operative to cause other devices on the network to reset their communication with the WAN access point. The conditional response logic can be operative to issue alerts to one or more users of the system about detected conditions of concern. The conditional response logic can be operative to display information about detected conditions of concern to the user. The conditional response logic can be operative to initiate or recommend updating of software or threat rules for one or more of the other devices on the network. The inspection logic can be operative to detect threats such as rogue devices, ransomware, or information leakage. The inspection logic can be operative to detect usage metrics. The inspection logic can be operative to detect content on the wireless network that is identified as inappropriate. The inspection logic can be operative to detect advertising behavior on the wireless network that is identified as inappropriate. The capture logic and inspection logic can be operative to capture and inspect different types of datagrams in the OSI model. The wireless network can be a residential or small office local network connected to an ISP modem. The wireless network can be a public local network serving a public space, such as a hotel or restaurant. The network interface and the capture logic can be part of a smart phone, personal computer, or laptop that also includes a general-purpose operating system accessible to the user. At least the network interface and the capture logic can be part of a dedicated wireless network monitoring appliance. The wireless network can be a Wi-Fi network. The WAN can be the public Internet.

In another general aspect, the invention features a wireless network monitoring method that includes accessing traffic on a wireless network that is connected to other devices and to a WAN access point, capturing datagrams communicated between one or more of the other devices on the wireless network and the WAN access point, inspecting the captured datagrams to detect conditions of concern related to the other devices on the wireless network, and initiating actions in response to the detection of conditions of concern by the inspection logic.

In a further general aspect, the invention features a wireless network monitoring system that includes means for accessing traffic on a wireless network that is connected to other devices and to a WAN access point, means for capturing datagrams communicated between one or more of the other devices on the wireless network and the WAN access point, means for inspecting the captured datagrams to detect conditions of concern related to the other devices on the wireless network, and means for initiating actions in response to the detection of conditions of concern by the inspection logic.

Systems according to the invention can easily installed, updated, and used to provide high levels of security on even the simplest home and small-office Wi-Fi networks.

DETAILED DESCRIPTION OF AN ILLUSTRATIVE EMBODIMENT

Figure 2:
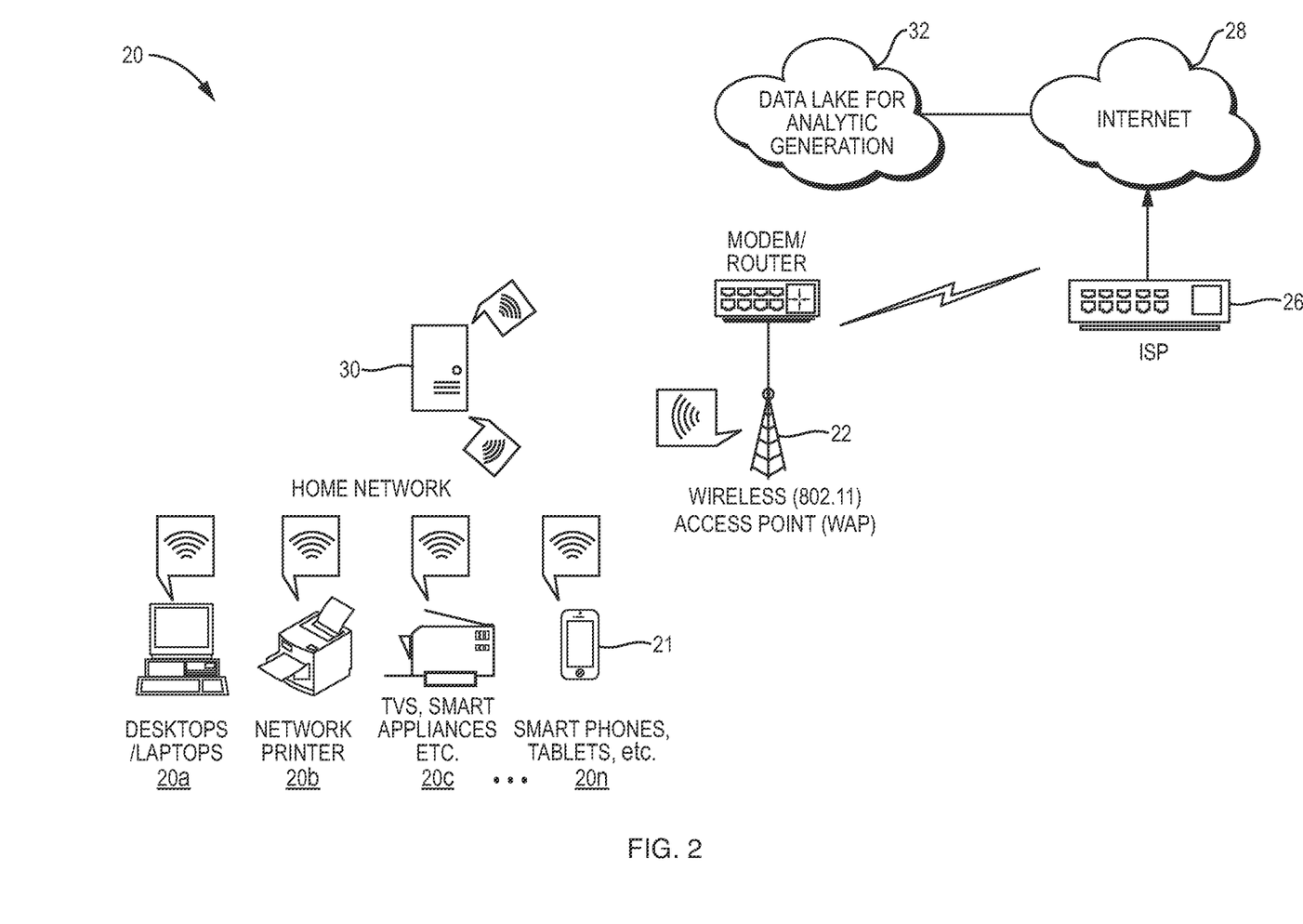
FIG. 2 is a flowchart of a wireless home network that uses a wireless network monitoring system according to the invention.

Referring to FIG. 2, a wireless home network 20 can employ a sensor 30 to wirelessly monitor traffic between devices 20a, 20b, 20c . . . 20n and the Internet 28 or another potentially insecure network, via a network access point 22, modem/router 24, and Internet service provider (ISP) infrastructure 26. Although the sensor can itself perform security functions, it is generally preferable for it to communicate with a remote data repository or data lake 32 where the monitored traffic can be more efficiently processed. This repository can be accessed from different sensors for different networks.

Figure 3:
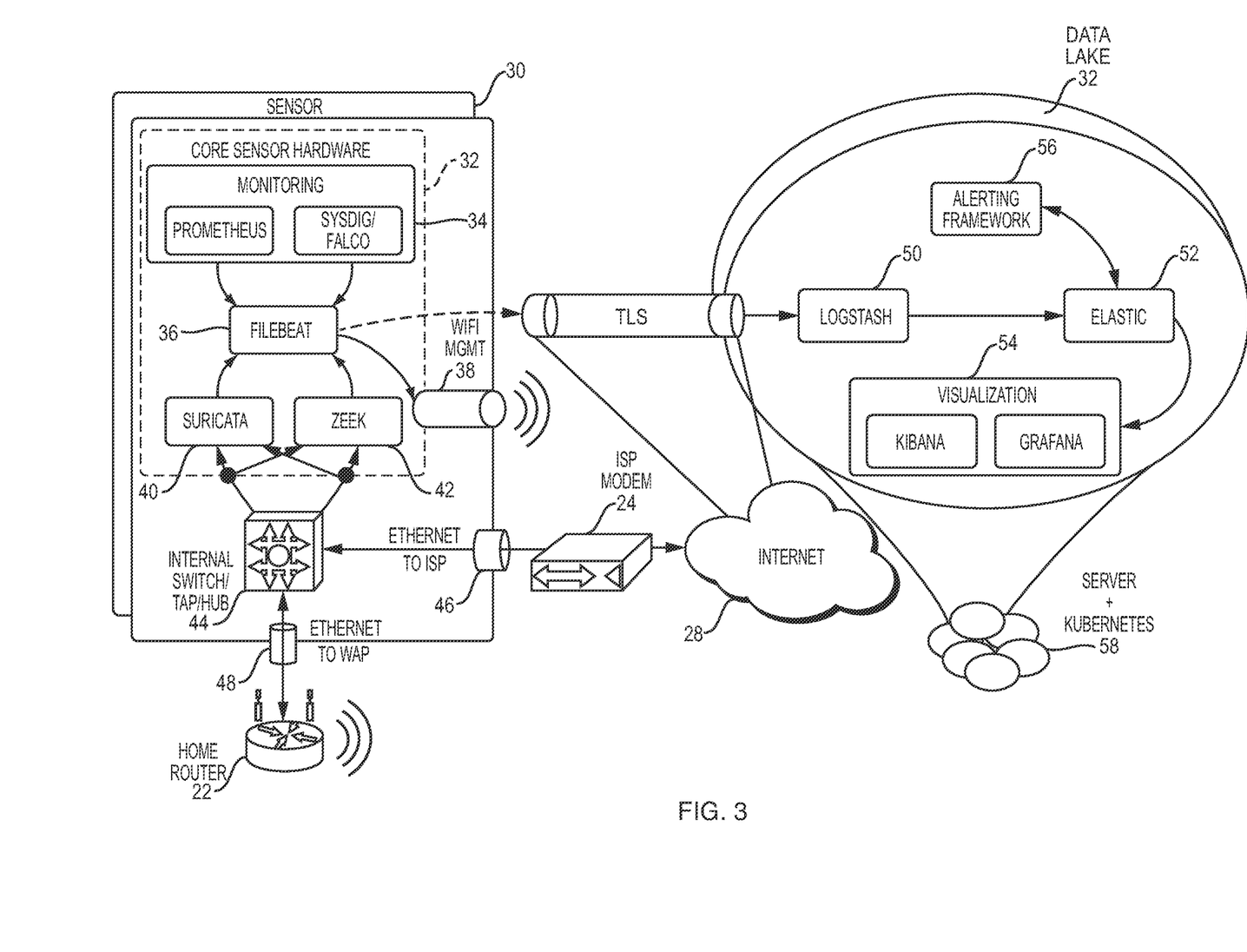
FIG. 3 is a diagram of an embodiment of a system according to the invention, in in-line mode.

The network sensor 30 provides real-time passive network monitoring that alerts users of perceived threats. It can be implemented as a hardware sensor that supports in-line and WiFi monitoring. When the sensor is operating in the in-line mode, it can be installed physically between the user's wireless access point (WAP) and the ISP's cable modem (FIG. 3). When operating in the wireless monitoring mode, users can configure the sensor to passively monitor a set of wireless networks through the wireless interface. A sensor can also be implemented as a mobile application that can be used without specialized hardware, but additional processing may be required in the data lake.

Figure 4:
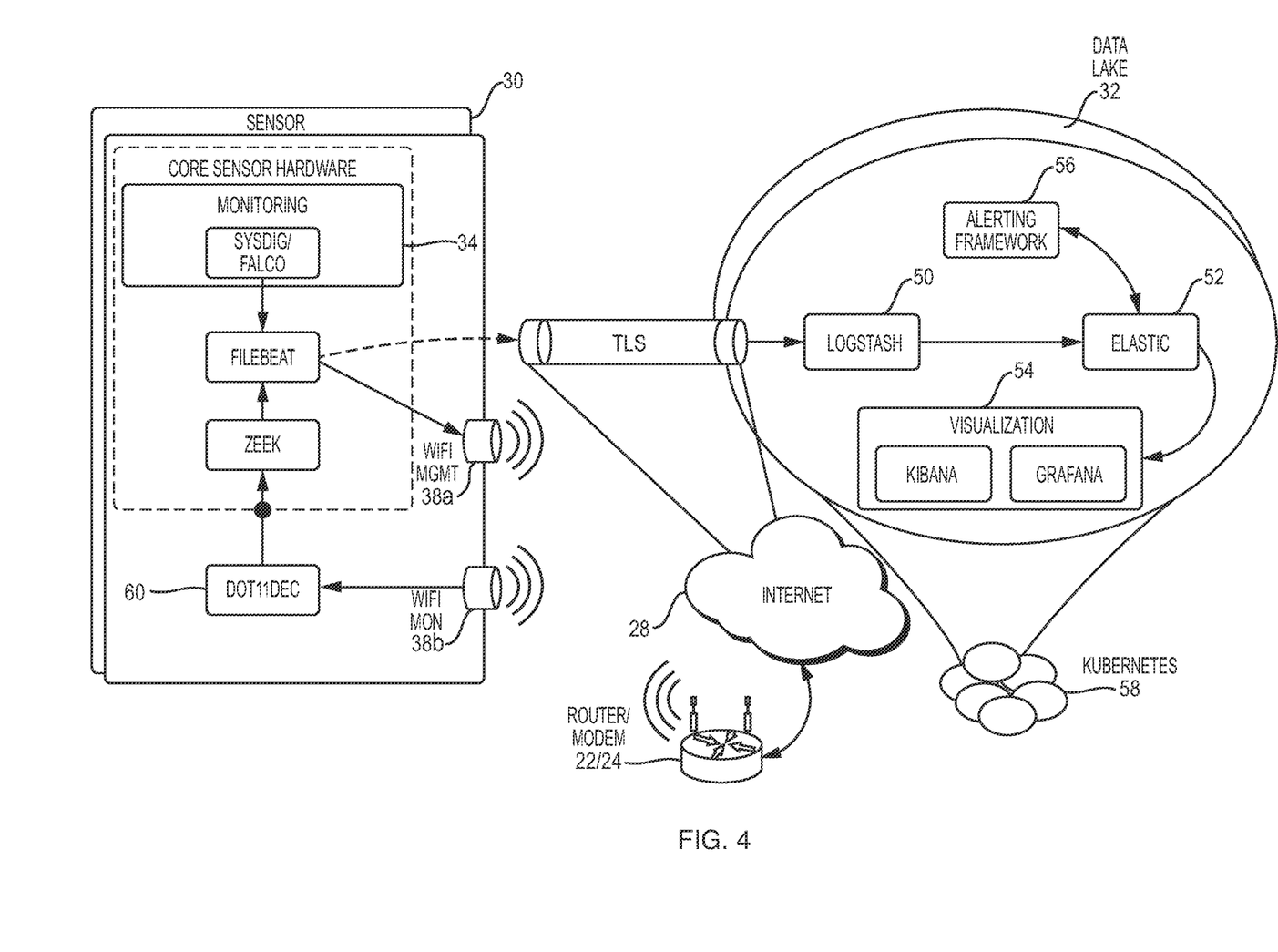
FIG. 4 is a diagram of the system of FIG. 3, in Wi-Fi monitoring mode.

Referring also to FIGS. 3 and 4, the in-line (LAN) packet capture approach pairs the core processing device with a consumer device that supports packet mirroring (TAP, SPAN, or a hub). TAP and SPAN are tested methods for monitoring that will have few configuration challenges. There are three potential approaches for tapping the connection between the WAP and the ISP modem: TAP, hub, or SPAN (port mirroring). The TAP is typically a low-cost passive solution. Passive TAPs that supports full-duplex require two monitoring interfaces. Active TAPs that only require a single interface generally are much more expensive. The LAN throwing star is an excellent low-cost example of a passive hardware TAP that support full-duplex communications, but our experiments have not found it to be reliable in this application. Hubs are also low-cost solutions, but they are typically half-duplex and only support up to 100 Mbps, and they appear to be in the process of being phased out.

Both TAPs and hubs have a high degree of reliability, and they mirror traffic reliably. New managed switches support port mirroring (SPAN) at a relatively low-cost point. Port mirroring requires some up-front configuration, and there are some reports of some potential reliability issues. SPAN supports full-duplex communication and only requires a single monitoring interface.

The wireless packet capture approach uses a traditional wireless interface in "monitor" mode to sniff the network traffic. WiFi monitoring is potentially more difficult due to packet loss and the ability to capture WPA2 associations. But it also has the advantage of not requiring a physical connection or access to the modem/router. It can therefore be easily deployed in a variety of situations. It may even be used when traveling, such as with hotel or restaurant Wi-Fi networks.

When monitoring a WiFi network configured to use WPA/WPA2, the encryption is based on the pre-shared key (the WiFi password) and each individual handshake. When a new device connects, it is necessary to capture the initial packets in order to decrypt all future traffic. Zeek does not currently support this decryption, so third-party tools are leveraged to provide this functionality. These were designed to force the capture of the handshakes. When the sensor is monitoring a network and a handshake is missed, the sensor de-authenticates ("bumps") the device from the network, causing another authentication event to occur.

The current embodiment uses an Intel NUC with LAN and WiFi USB adapters to extend the functionality. A NETGEAR GS305E smart-switch with port mirroring is used to mirror traffic from the modem to the sensor. The sensor is connected to the mirrored port of the switch via the USB3.0 adapter. The additional WiFi adapter allows the sensor to monitor and transmit data at the same time. It also allows the sensor to monitor the network used for management and dataflow, so no separate network is required.

The sensor hardware is shown in FIGS. 3-4 and satisfies the requirements for a network sensor to provide adequate coverage for a home or small business network. Zeek 42 is used for packet processing. Zeek generates a rich log set that is sent back to the data lake for analysis and visualization. Zeek's logging framework is a natural complement to an ELK stack, and tools like Filebeat 36 allow the sensor to securely and efficiently transfer logs back to the data lake via the management interface. This management interface is the sensor's dataflow connection through the network it is monitoring (usually through WiFi). Filters in Zeek prevent the sensor from logging its traffic and overwhelming the network. Prometheus and Sysdig/Falco 34 monitor the sensor itself and over a wide range of alerting based on resource utilization and security events. Prometheus and Sysdig/Falco logs are also transferred via Filebeat.

The security of the sensor itself is one of the most important design characteristics. All software is containerized, making updates easier and less volatile. Further, containerization offers superior security properties over native software solutions. Sysdig/Falco provide operational security alerting on any events that occur on the sensor. The monitoring interfaces are not used for any form of communication. SSH management is configured as key-based to a non-root account with multi-factor authentication. Each sensor will have a unique root/sudo password to prevent trivial privilege escalation.

Users are not intended to have direct access to the sensor itself. Its hard disk drive (HDD) is encrypted, and at no point during the configuration do users have a shell on the device.

TABLE 1 sensor software components

| Software | Description | Reference |
| --- | --- | --- |
| Zeek | NSM capable of generating a rich log set compatible with ELK | https://zeek.org/ |
| Filebeat | Efficient method of shipping logs compatible with ELK | https://www.elastic.co/beats/filebeat |
| Prometheus | Versatile resource monitoring framework | https://prometheus.io/ |
| Sysdig/Falco | Versatile security monitoring and alerting framework | https://sysdig.com/opensource/falco/ |

The sensor has a unique hardware configuration process in which the user plugs in a custom hardware token that the sensor verifies (cryptographically). When the sensor detects the hardware token during the boot process, the sensor enters a configuration mode. This mode allows the user to configure the management and monitor networks (and their respective passwords). It also allows the user to select between LAN and wireless modes. When the token is removed and the sensor is rebooted, the new configuration is loaded and used.

The mobile version of the network sensor will leverage existing devices to capture raw network traffic. This traffic is compressed and sent back to the data lake for processing. There are several possibilities for the mobile design, including Android and iOS embodiments. These designs may vary, depending on application store rules.

Users can download mobile applications on a number of devices and configure the monitoring pattern in their account. This monitoring pattern governs when each device is monitoring and for how long. When monitoring, the device will be disconnected from the network, so there will be a configurable monitor/transmit ratio. Depending on the size of the network and the device proximity, there are established approaches that can be leveraged to provide optimal coverage across a number of devices while minimizing the load on any individual device.

When using the mobile application, client authentication will be tracked in the data lake. Clients will receive commands to de-authenticate devices whose handshake has not been captured and stored. Clients will also be configured to ignore other devices that are currently monitoring the network. A VPN-based solution will be used to monitor all of the device traffic.

The network sensor can be form factor agnostic. The sensor only requires sufficient hardware—processor, memory, and NIC (network interface card(s))—to capture datagrams, perform minimal processing, compress, and transmit opportunistically to a cloud based data lake. Thus the software sensor may be deployed on a small computer or on a phone, tablet, etc. The more devices running the sensor software, the more coverage of traffic on a specific wireless network.

After the network sensor captures wireless traffic, it parses the datagrams into log files, categorized by application or transport layer protocol. The logs are compressed and transmitted to a cloud based data lake for processing. Near real-time analytics are created and displayed back to a wireless network owner via a mobile application dashboard (e.g., in application window 21 on device 20n).

Applications of WSS include malicious event detection (malware, data exfiltration, compromised PII, etc.), device patching recommendations, identification of inappropriate content, advertising destinations, etc. When one or more conditions in the log files are detected that indicate that an event has occurred or is occurring, the system can initiate a corresponding action. One or more users can be alerted, for example, such as via email or text message. The alerts can list one or more remedial action that the user can take, such to patch outdated software on a device in the network.

The back-end data lake will consume, analyze, and visualize the sensor logs. Components of the data lake are shown in FIGS. 2 and 3. Logstash is used to store the logs in an Elastic cluster, and Kibana and Grafana are used to explore and visualize that data and host-based telemetry. The alerting can be implemented using Sigma+Python to provide flexibility. In the mobile sensor implementation, PCAP captured traffic will be set back to the data lake for processing. A virtual sensor will process the PCAP captured traffic and generate metadata logs that can be stored in the data lake.

TABLE 2

| sensor software components | | |
| --- | --- | --- |
| Software | Description | Reference |
| Elastic | Powerful data storage solution with fast searches | https://www.elastic.co/ |
| Logstash | Simple solution for storing logs in Elastic. Compatible with Filebeat | https://www.elastic.co/logstash |
| Kibana | Simple frontend solution for visualizing logs in Elastic | https://www.elastic.co/kibana |
| Grafana | Another frontend solution for creating dashboards and visualizations form Elastic | https://grafana.com/ |
| Alerting | Possibly Python + Sigma for alerting based on Elastic logs | https://github.com/Neo23x0/sigma |

The system described above has been implemented in connection with digital logic, storage, and other elements embodied in special-purpose software running on a general-purpose computer platform, but it could also be implemented in whole or in part using virtualized platforms and/or special-purpose hardware. And, while open-source software has been used extensively in the design, commercial implementations of the functionality embodied in that software could also be used, and/or some or all of the functionality could be implemented using custom software. For example, while the open-source Elastic storage software is used to store and search data in the data lake, one or more other types of storage software could be used to perform those types of functions. In addition, while software selected from a particular combination of open-source projects has been selected to implement illustrative embodiments of the invention, as shown in the various figures for illustration purposes, one of ordinary skill in the art would recognize that it is also possible to make different architectural choices that could achieve a different breakdown, such as by combining and/or splitting functional elements differently. The current documentation version for each of the above-referenced software components listed in Tables 1-2 as of the time of filing is herein incorporated by reference.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A portable wireless network monitoring system, comprising:
a wireless network interface operative to wirelessly access traffic as it is being transmitted wirelessly on a wireless network, wherein the wireless network operates according to a wireless protocol and wirelessly connects other devices and wirelessly connects to a Wide Area Network (WAN) access point, wherein the wireless network interface is also operative to wirelessly communicate with the WAN access point, and wherein the wireless network interface is part of a portable sensor that is located within a wireless communication range of the wireless network,
capture logic responsive to the wireless network interface and operative to capture different types of datagrams in the OSI model in the traffic communicated wirelessly via the wireless protocol between one or more of the other devices on the wireless network and the WAN access point, wherein the capture logic is part of the portable sensor that is located within the wireless communication range of the wireless network, parsing logic that parses the different types of datagrams into categorized log files, inspection logic responsive to the capture logic and operative to inspect both the destination and content of the captured datagrams in the categorized log files to detect conditions of concern in the categorized log files related to the other devices on the wireless network, wherein the inspection logic is part of a remote data repository system connected to a wide area network on an opposite side of the WAN access point from the sensor, conditional response logic responsive to the inspection logic and operative to issue alerts to one or more users of the system in response to the detection of conditions of concern by the inspection logic, wherein the conditional response logic is part of the remote data repository system connected to the wide area network on the opposite side of the WAN access point from the sensor, and wherein the capture logic, inspection logic, and conditional response logic are all implemented with software.

2. The system of claim 1, wherein the portable sensor includes a second network interface operative to communicate with the remote data repository system via the WAN access point.

3. The system of claim 1 wherein the wireless network interface is a dual-mode interface that can also be configured for connection between the other devices and the WAN access point using unshielded twisted pair cable.

4. The system of claim 1 further including one or more additional wireless network interfaces in one or more additional portable sensors located within a wireless communication range of the wireless network operative to access traffic on the wireless network and additional corresponding capture logic to perform distributed monitoring of the wireless network.

5. The system of claim 4 further including load-balancing logic operative to balance the distribution of monitoring tasks.

6. The system of claim 1 further including opportunistic communication logic operative to delay or skip operations based on traffic conditions on the wireless network.

7. The system of claim 1 further including remote communication reset logic operative to cause the other devices on the network to reset their respective communications with the WAN access point.

8. The system of claim 1 wherein the conditional response logic is operative to display information about detected conditions of concern to a user of the system.

9. The system of claim 1 wherein the conditional response logic is operative to initiate or recommend updating of software or threat rules for one or more of the other devices on the network.

10. The system of claim 1 wherein the inspection logic is operative to detect threats including at least one of rogue devices, ransomware, and information leakage.

11. The system of claim 1 wherein the inspection logic is operative to detect usage metrics.

12. The system of claim 1 wherein the wireless network is a residential or small office local network connected to an Internet Service Provider (ISP) modem.

13. The system of claim 1 wherein the wireless network is a public local network serving a public space including at least a hotel or restaurant.

14. The system of claim 1 wherein at least the network interface and the capture logic are part of a smart phone, personal computer, or laptop that also includes a general-purpose operating system accessible to a user of the system.

15. The system of claim 1 wherein at least the network interface and the capture logic are part of a dedicated wireless network monitoring appliance.

16. The system of claim 1 wherein the wireless network is a Wi-Fi network.

17. The system of claim 1 wherein the WAN is the public Internet.

18. A portable wireless network monitoring method, comprising:

wirelessly accessing by a portable sensor at a first location traffic as it is being transmitted wirelessly on a first wireless network that operates according to a wireless protocol, is wirelessly connected to other devices and wirelessly connected to a first Wide Area Network (WAN) access point, and wirelessly communicating with the first WAN access point, wherein the portable sensor is located within a wireless communication range of the wireless network, capturing by the portable sensor different types of datagrams in the OSI model in the traffic communicated wirelessly on the first wireless network via the wireless protocol between one or more of the other devices on the first wireless network and the first WAN access point, parsing the different types of captured datagrams from the first wireless network into categorized log files, inspecting, at a remote data repository system connected to a wide area network on an opposite side of the WAN access point from the portable sensor, both the content and destination of the captured datagrams in the categorized log files for the traffic communicated wirelessly on the first wireless network to detect conditions of concern in the categorized log files related to the other devices on the first wireless network, issuing alerts at the remote data repository system to one or more users of the method in response to the detection of conditions of concern by the inspecting of the content captured in the traffic communicated wirelessly on the first wireless network, moving the sensor to a second location different from the first location, wirelessly accessing by the portable sensor at the second location traffic as it is being transmitted wirelessly on a second wireless network, different from the first wireless network, that operates according to a wireless protocol, is wirelessly connected to further devices, and wirelessly connected to a second Wide Area Network (WAN) access point, and wirelessly communicating with the second WAN access point, capturing by the portable sensor different types of datagrams in the traffic communicated wirelessly on the second wireless network via the wireless protocol between one or more of the further devices on the second wireless network and the second WAN access point, parsing the different types of captured datagrams from the second wireless network into categorized log files, inspecting at the remote data repository system the content of datagrams in the categorized log files captured in the traffic communicated wirelessly on the second wireless network to detect conditions of concern in the categorized log files related to the other devices on the second wireless network, and issuing alerts at the remote data repository system to one or more users of the method at the remote data repository system in response to the detection of conditions of concern by the inspecting of the content captured in the traffic communicated wirelessly on the second wireless network.

19. A wireless network monitoring system, comprising:
means for wirelessly accessing traffic as it is being transmitted wirelessly on a wireless network, wherein the wireless network operates according to a wireless protocol and wirelessly connects to other devices and wirelessly connects to a Wide Area Network (WAN) access point, and for wirelessly communicating with the WAN access point, and wherein the means for wirelessly accessing traffic are part of a portable sensor that is located within a wireless communication range of the wireless network,
means for capturing different types of datagrams in the OSI model in the traffic communicated wirelessly via the wireless protocol between one or more of the other devices on the wireless network and the WAN access point, wherein the means for capturing are part of the portable sensor that is located within a wireless communication range of the wireless network,
means for parsing the different types of datagrams into categorized log files,
means for inspecting both the content and destination of the captured datagrams in the categorized log files to detect conditions of concern in the categorized log files related to the other devices on the wireless network, wherein the means for inspecting are part of a remote data repository system connected to a wide area network on an opposite side of the WAN access point from the portable sensor, and
means for issuing alerts to one or more users of the wireless network monitoring system in response to the detection of conditions of concern by the means for inspecting, wherein the means for issuing alerts are part of the remote data repository system connected to the wide area network on an opposite side of the WAN access point from the portable sensor.

* * * * *